(12) United States Patent
Xu et al.

(10) Patent No.: US 11,706,829 B2
(45) Date of Patent: Jul. 18, 2023

(54) METHOD FOR DATA FORWARDING IN A SMALL CELL SYSTEM (71) Applicant: Samsung Electronics Co., Ltd., Suwon-si (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 17/302,617

(22) Filed: May 7, 2021

(65) Prior Publication Data

US 2021/0321474 A1 Oct. 14, 2021

Related U.S. Application Data (63) Continuation of application No. 16/726,127, filed on Dec. 23, 2019, now Pat. No. 11,006,472, which is a
(Continued)

(30) Foreign Application Priority Data

Mar. 5, 2014 (CN) .......................... 201410078566.6

(51) Int. Cl.
*H04W 76/15* (2018.01)
*H04W 36/00* (2009.01)
(Continued)

(52) U.S. Cl.
CPC ........ *H04W 76/15* (2018.02); *H04W 36/0011* (2013.01); *H04W 36/0055* (2013.01);
(Continued)

(58) Field of Classification Search
CPC .. H04W 28/18; H04W 72/0426; H04W 36/38
See application file for complete search history.

(56) References Cited

U.S. PATENT DOCUMENTS

2008/0186965 A1 8/2008 Zheng et al.
2012/0100803 A1 4/2012 Suumaki et al.
(Continued)

FOREIGN PATENT DOCUMENTS

CN 102892153 A 1/2013
CN 103228016 A 7/2013
(Continued)

OTHER PUBLICATIONS

China National Intellectual Property Administration Office Action regarding Patent Application No. 201410078566.6, dated Nov. 2, 2018, 10 pages.
(Continued)

*Primary Examiner* — Sam Bhattacharya (57) ABSTRACT

A method for data forwarding in a small cell system comprises: sending by a master base station (MeNB) to a target secondary base station (SeNB) information of a source SeNB or a source SeNB cell where a user equipment (UE) is located; determining by the target SeNB whether a direct data forwarding is feasible; notifying, by the target SeNB, the MeNB whether the direct data forwarding is feasible; and determining by the MeNB whether it is a direct data forwarding or an indirect data forwarding. The method for data forwarding provided in the present application may support both the direct data forwarding and the indirect data forwarding based on actual situation of the network, reduce data loss and failure of data forwarding, and improve the efficiency of data forwarding.

16 Claims, 8 Drawing Sheets

Related U.S. Application Data continuation of application No. 16/429,342, filed on Jun. 3, 2019, now Pat. No. 10,517,130, which is a continuation of application No. 15/425,892, filed on Feb. 6, 2017, now Pat. No. 10,314,095, which is a continuation of application No. 14/639,882, filed on Mar. 5, 2015, now Pat. No. 9,565,670.

(51) Int. Cl.
*H04W 72/23* (2023.01)
*H04W 72/27* (2023.01)
*H04W 36/38* (2009.01)
*H04W 76/11* (2018.01)
*H04W 28/18* (2009.01)

(52) U.S. Cl.
CPC ....... *H04W 36/0069* (2018.08); *H04W 36/38* (2013.01); *H04W 72/23* (2023.01); *H04W 72/27* (2023.01); *H04W 76/11* (2018.02); *H04W 28/18* (2013.01)

(56) References Cited

U.S. PATENT DOCUMENTS

| | | |
|---|---|---|
| 2013/0089070 A1 | 4/2013 | Sharony et al. |
| 2013/0235778 A1 | 9/2013 | Maeder et al. |
| 2013/0286851 A1 | 10/2013 | Moser et al. |
| 2014/0056243 A1 | 2/2014 | Pelletier et al. |
| 2015/0257146 A1 | 9/2015 | Xu et al. |

FOREIGN PATENT DOCUMENTS

| | | |
|---|---|---|
| CN | 103517357 A | 1/2014 |
| CN | 104902580 A | 9/2015 |
| JP | 2014039118 A | 2/2014 |

OTHER PUBLICATIONS

Extended European Search Report for European Application No. 15758373.3, dated Nov. 7, 2017, 12 pages.

Intel Corporation, "SeNB switching procedure in dual connectivity," 3GPP TSG-RAN WG2 Meeting #85; R2-140258; Prague, Czech Republic, Feb. 10-14, 2014, 4 pages.

Ericsson, "Dual connectivity—mobility scenarios," 3GPP TSG-RAN WG3 Meeting #83; R3-140346; Prague, Czech Republic, Feb. 10-14, 2014, 7 pages.

ZTE Corporation, "Discussion on handover procedure for small cell," 3GPP TSG-RAN2 Meeting #85; R2-140921 Prague, Czech Republic, Jan. 10-14, 2014, 4 pages.

Nsn, et al., "SeNB change and inter-MeNG handover procedure," 3GPP TSG-RAN WG3 Meeting #83; R3-140424; Prague, Czech Republic, Feb. 10-14, 2014, 8 pages.

International Search Report, dated May 29, 2015, in connection with PCT/KR2015/002133; 3 pages.

The Third Office Action in connection with Chinese Application No. 20140078566.6 dated May 7, 2020, 21 pages.

Office Action dated Nov. 24, 2020 in connection Korean Application No. 10-2015-0030967, 10 pages.

Broadcom Corporation, "SCG handover for Dual Connectivity," R2-140424, 3GPP TSG-RAN WG2 Meeting #85, Prague, Czech Republic, Feb. 10-14, 2014, 6 pages.

European Patent Office, "Extended European Search Report," dated Mar. 16, 2023, in connection with European Patent Application No. 22203494.4, 11 pages.

METHOD FOR DATA FORWARDING IN A SMALL CELL SYSTEM

CROSS-REFERENCE TO RELATED APPLICATIONS

This application is a continuation of U.S. application Ser. No. 16/726,127, filed Dec. 23, 2019, now U.S. Pat. No. 11,006,472, which is a continuation of U.S. application Ser. No. 16/429,342, filed Jun. 3, 2019, now U.S. Pat. No. 10,517,130, which is a continuation of U.S. application Ser. No. 15/425,892, filed Feb. 6, 2017, now U.S. Pat. No. 10,314,095, which is a continuation of U.S. application Ser. No. 14/639,882, filed Mar. 5, 2015, now U.S. Pat. No. 9,565,670, which claims priority to Chinese Patent Application No. 201410078566.6, filed Mar. 5, 2014. The contents of the above-identified patent documents is incorporated herein by reference.

BACKGROUND

1. Field

The present application relates to wireless communication technologies, and more particularly, to a method for data forwarding in a small cell system.

2. Description of Related Art

Current mobile communication is more and more tending to provide multimedia service with high rate transmission to users. A system architecture of System Architecture Evolution (SAE) includes elements to provide mobility context, session context and security information of the UE.

The 3rd Generation Partnership Project (3GPP) has proposed requirements of small cell enhancement in release 12 (Rel-12). Target scenarios of the small cell enhancement include scenarios with macro cell coverage and without macro cell coverage, indoor and outdoor, ideal and non-ideal backhaul enhancement.

SUMMARY

To address the above-discussed deficiencies, it is a primary object to provide a method for data forwarding, which may support both a direct data forwarding and an indirect data forwarding based on actual situation of the network, reduce data loss and failure of data forwarding, and improve the efficiency of data forwarding.

In a first embodiment, a method for data forwarding is provided. The method includes sending, by a MeNB, to a target SeNB information of a source SeNB or a source SeNB cell where radio resource is assigned to a UE; determining, by a target SeNB, whether a direct data forwarding is feasible; notifying, by a target SeNB, the MeNB whether the direct data forwarding is feasible; and determining, by the MeNB, whether it is a direct data forwarding or an indirect data forwarding.

In one example, the information of the source SeNB where radio resource is assigned to a UE, sent by the MeNB, is a base station identifier of the source SeNB.

In another example, the information of the source SeNB cell where radio resource is assigned to a UE, sent by the MeNB, is a cell identifier or a cell global identifier of the source SeNB cell.

In one example, the MeNB determines whether it is the direct data forwarding or the indirect data forwarding according to whether the direct data forwarding is feasible, which is received from the target SeNB.

In another example, the MeNB further comprises: when the direct data forwarding is determined by the MeNB, the MeNB sends to the source SeNB a tunnel endpoint identifier (TEID) and an address of Transport Network Layer (TNL), which are received from the target SeNB; or when the indirect data forwarding is determined by the MeNB, the MeNB allocates a TEID and a TNL address for the data forwarding, and sends the allocated TEID and TNL address to the source SeNB.

It can be seen from the above technical scheme that the method for data forwarding provided in the present application may support both the direct data forwarding and the indirect data forwarding based on actual situation of the network, reduce data loss and failure of data forwarding, and improve the efficiency of data forwarding.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, an embodiment of the present disclosure will be described in detail with reference to the accompanying drawings.

In describing the exemplary embodiments of the present disclosure, descriptions related to technical contents that are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions also can be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions also can be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations can represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" can be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" can be either combined into a smaller number of elements, "unit", or "module" or divided into a larger number of elements, "unit", or "module". Moreover, the elements and "units" or "modules" can be implemented to reproduce one or more CPUs within a device or a security multimedia card.

The present application is further described in detail hereinafter with reference to the accompanying drawings to make the objective, technical solution and merits thereof more apparent.

Note that a direct data forwarding in the present application refers to: during SeNB change for a UE, data to be forwarded is sent directly from a source SeNB to a target SeNB. An indirect data forwarding refers to: data is sent from a source SeNB to a MeNB, and then from the MeNB to a target SeNB.

Figure 1:
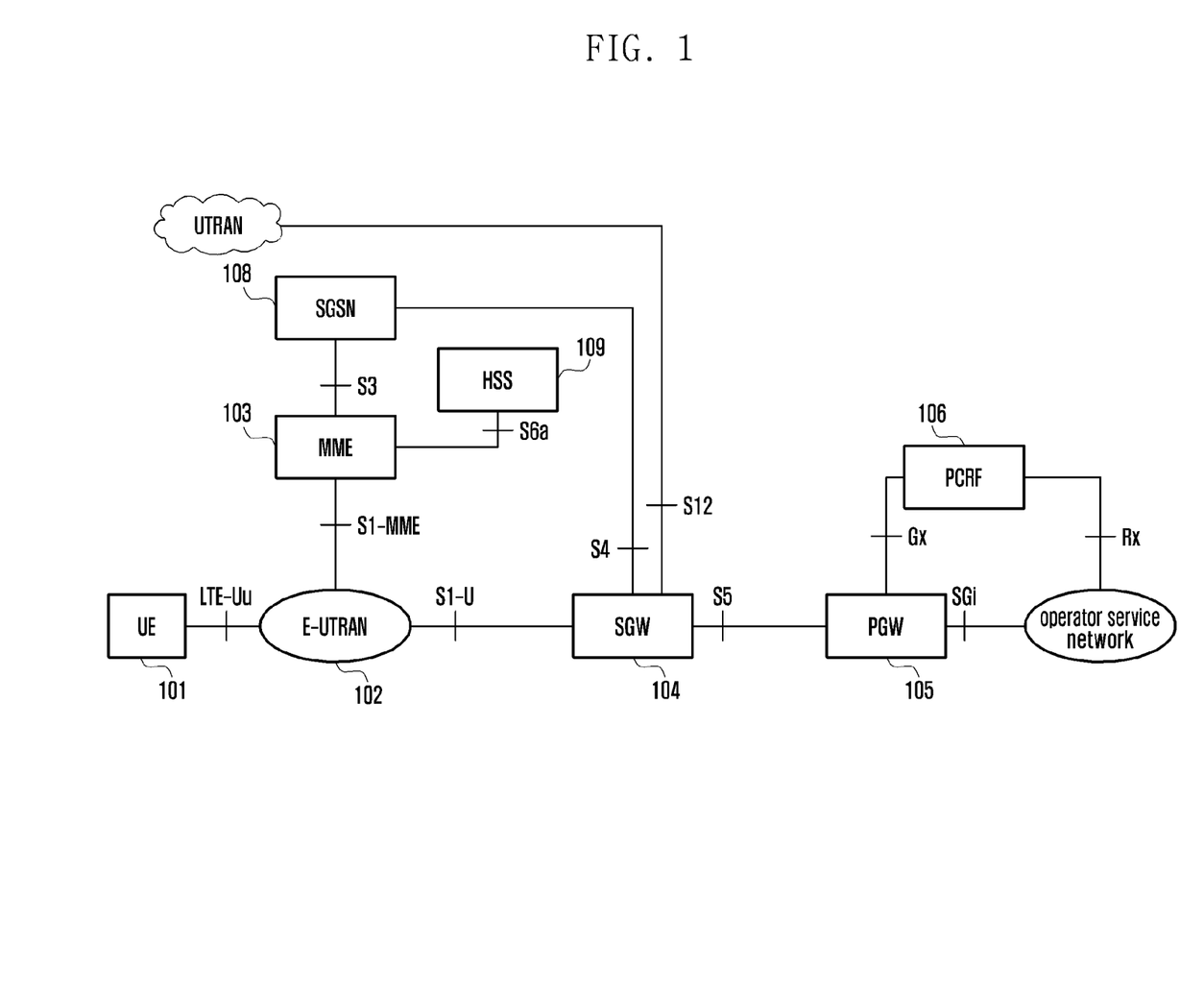
FIG. 1 is a schematic diagram illustrating an existing SAE system architecture.

FIG. 1 shows a system architecture of System Architecture Evolution (SAE). A user equipment (UE) 101 is a terminal device for receiving data. Evolved Universal Terrestrial Radio Access Network (E-UTRAN) 102 is a wireless access network, comprising a macro base station (eNodeB/NodeB) that can provide the UE an interface for accessing the wireless network. A mobility management entity (MME) 103 is responsible for managing mobility context, session context and security information of the UE. A serving gateway (SGW) 104 mainly provides the user-plane functions. The MME 103 and the SGW 104 can be located in the same physical entity. A packet data network gateway (PGW) 105 is responsible for functions, such as charging, monitoring, and also can be located in the same physical entity with the SGW 104. A policy and charging rules function entity (PCRF) 106 provides policy and charging rules of quality of service (QoS). A serving General Packet Radio Service (GPRS) support node (SGSN) 108 is a network node device providing routing for data transmission in Universal Mobile Telecommunications System (UMTS). A home subscriber server (HSS) 109 is a home subsystem of the UE, responsible for protecting information of the UE, including current location of the UE, an address of a serving node, security information of the UE, packet data context of the UE, and so forth.

Figure 2:
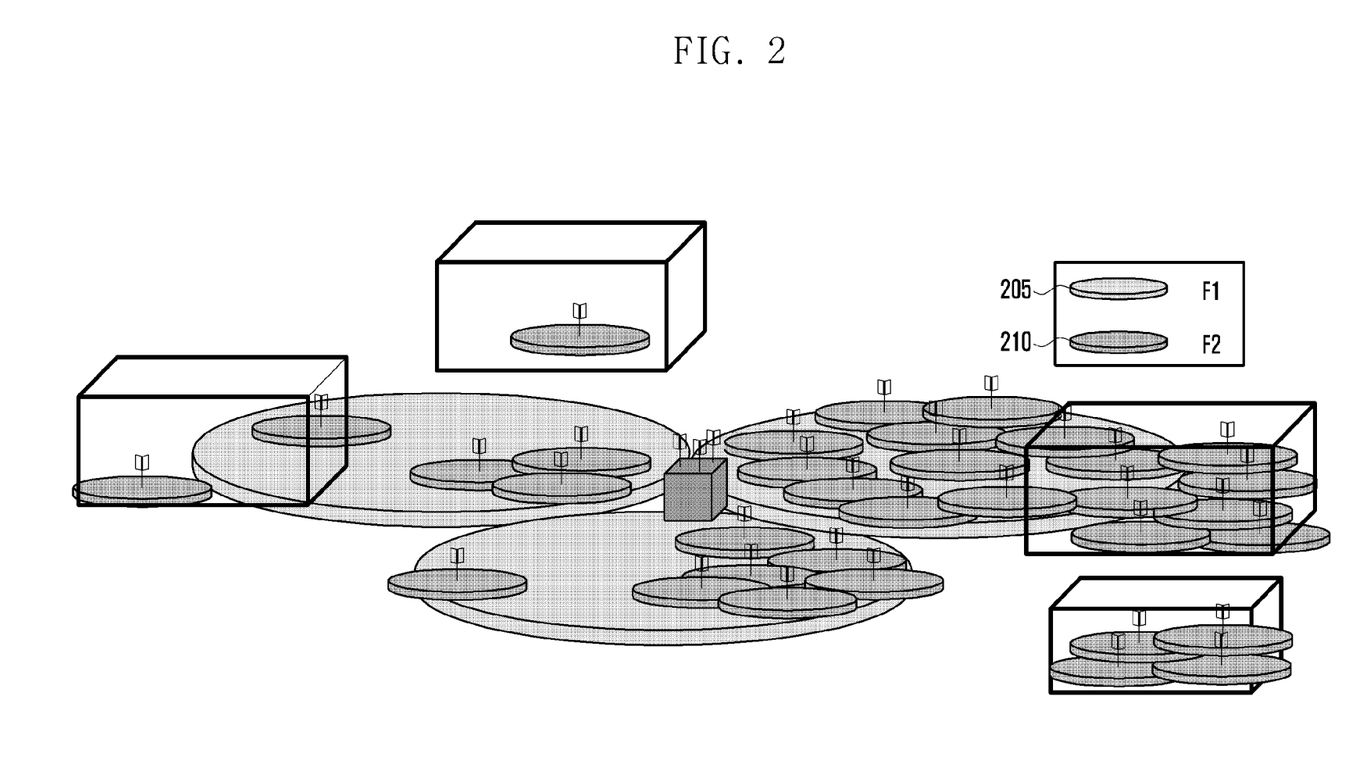
FIG. 2 is a schematic diagram illustrating deployment scenarios of small cell enhancement.

FIG. 2 illustrates small cell coverages with macro cell coverage and without macro cell coverage, indoor and outdoor, ideal and non-ideal backhaul enhancement. In the case with macro cell coverage, it has been proposed to apply a technique of carrier aggregation at different base stations. A macro cell and a small cell can work in different bands, such as (F1) 205 for macro cell and (F2) for small cell 210. There are two kinds of architectures that apply the technique of carrier aggregation at different base stations, i.e., one based on Radio Access Network (RAN) split, and the other based on Core Network (CN) split, for the user-plane data. The architecture based on CN split means that for a bearer established on a pico cell, the user-plane data is directly sent by the CN entity SGW to the pico, but not forwarded by the macro.

In the architectures of small cells, the UE may simultaneously transmit and receive data to and from two base stations, named as dual-connectivity, in which only one base station is responsible for sending a Radio Resource Control (RRC) message to the UE, and interconnect with the CN control-plane entity MME, such base station named as a master base station (MeNB), and the other named as a secondary base station (SeNB). One cell with the MeNB for the UE is a primary cell (Pcell) of the UE, through which a RRC message is sent to the UE, and other cells are secondary cells (Scells). One cell among the Scells of the SeNB is a primary Scell of the SeNB (pScell), providing functions of the pScell. There is a physical uplink control channel in the pScell, but none in other Scells. A cell group of the MeNB is named as MCG, and a cell group of the SeNB is named as SCG.

A problem, which is not solved by the prior art, is how to forward data between two base stations when the SeNB of the UE is required to be changed from one base station to the other.

Figure 3:
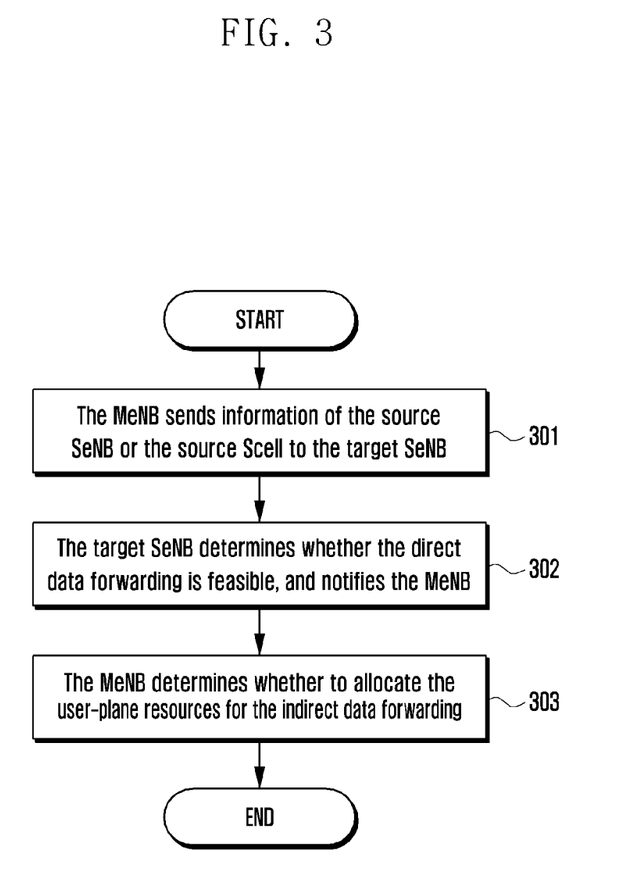
FIG. 3 is a flow chart illustrating a method for data forwarding in a small cell system according to an embodiment of the present application.

FIG. 3 is a flow chart illustrating a method for data forwarding in a small cell system according to an embodiment of the present application, including the following blocks.

In block 301, a MeNB sends to a target SeNB information of a source SeNB or a source SeNB cell where radio resource is assigned to a UE. The information of the source SeNB can be a base station identifier of the source SeNB. The information of the source SeNB cell can be a cell identifier or a cell global identifier of the source SeNB cell. If there are a plurality of Scells at the source SeNB for the UE, the information of the SeNB cell can be a cell identifier of any of the Scells or cell identifiers of all the Scells.

The MeNB includes the above-described information of the source SeNB or the source SeNB cell only when the SeNB changes.

In block 302, the target SeNB determines whether the direct data forwarding is feasible, and notifying the MeNB whether the direct data forwarding is feasible. The target SeNB determines whether the direct data forwarding is feasible according to whether there is an X2 interface available between itself and the source SeNB. If yes, the direct data forwarding is feasible, otherwise it is infeasible. The target SeNB also can consider configurations of operation and maintenance (O&M) to determine whether the direct data forwarding is feasible. For example, if the direct data forwarding is configured by the O&M and there is an X2 interface available between the target SeNB and the source SeNB, the direct data forwarding is feasible. If the indirect data forwarding is configured by the O&M, the direct data forwarding is infeasible. The existence of X2 interface between the target SeNB and the source SeNB is necessary to be considered by the target SeNB, however, this does not exclude that the target SeNB can also consider other factors to determine whether the direct data forwarding is feasible.

The target SeNB can be aware that the bearer is switched between different SeNBs, rather than from the MeNB to the SeNB, according to the base station identifier of the source SeNB or the cell identifier of the source Scell in block 301, so as to determine whether the direct data forwarding is feasible. When the bearer is switched from the MeNB to the SeNB, the information of the source SeNB or the cell identifier of the source Scell in block 301 may not be included, such that the target SeNB can be aware that the switch is from the MeNB to the SeNB, without determining whether the direct data forwarding is feasible, consequently it is not necessary to indicate to the MeNB whether the direct data forwarding is feasible.

The target SeNB allocates the user-plane resources for the data forwarding. The target SeNB sends a TEID and a TNL address for the data forwarding to the MeNB. The TEID and TNL address are specified with respect to each bearer. For each bearer, the TEID and TNL address include the TEID and TNL address for uplink data forwarding or the TEID, or both, and TNL address for downlink data forwarding.

In block 303, the MeNB determines whether it is the direct data forwarding or the indirect data forwarding. If the direct data forwarding is feasible, the MeNB determines direct data forwarding, and sends the TEID and TNL address received from the target SeNB for the data forwarding to the source SeNB. When forwarding the data, the source SeNB directly forwards the data to the tunnel identified by the TEID of the target SeNB, which is identified by the TNL address. If the direct data forwarding is infeasible, the MeNB allocates the TEID and TNL address for the data forwarding, and then sends the allocated TEID and TNL address for the data forwarding to the source SeNB. For each bearer, the TEID and TNL address includes the TEID and TNL address for uplink data forwarding or the TEID, or both, and TNL address for downlink data forwarding. As such, the MeNB stores the TEID and TNL address used for the same bearer, which are allocated by the target SeNB. When forwarding the data, the source SeNB sends the data to the MeNB, and then the MeNB forwards the received data to the target SeNB according to the TEID and TNL address allocated by the target SeNB.

When the MeNB determines whether it is the direct data forwarding or the indirect data forwarding, the MeNB considers according to whether the direct data forwarding is feasible or not, as received from the target SeNB. The MeNB does not exclude that other factors can be considered to determine whether the direct data forwarding is feasible, which are not limited in the present application.

Note that when the target SeNB indicates the direct data forwarding is feasible, the MeNB also determines to apply the indirect data forwarding based on the configurations of O&M. If the indirect data forwarding is determined by the MeNB, the MeNB allocates the TEID and TNL address for the data forwarding, and then sends the allocated TEID and TNL address for the data forwarding to the source SeNB. For each bearer, the TEID and TNL address include the TEID and TNL address for uplink data forwarding or the TEID, or both, and TNL address for downlink data forwarding. As such, the MeNB stores the TEID and TNL address used for the same bearer, which are allocated by the target SeNB. When forwarding the data, the source SeNB sends the data to the MeNB, and then the MeNB forwards the received data to the target SeNB according to the TEID and TNL address allocated by the target SeNB.

Using the above-described method, the MeNB enables the network to support both the direct data forwarding and the indirect data forwarding based on actual situation of the network, reduce data loss and failure of data forwarding, and improve the efficiency of data forwarding.

Figure 4:
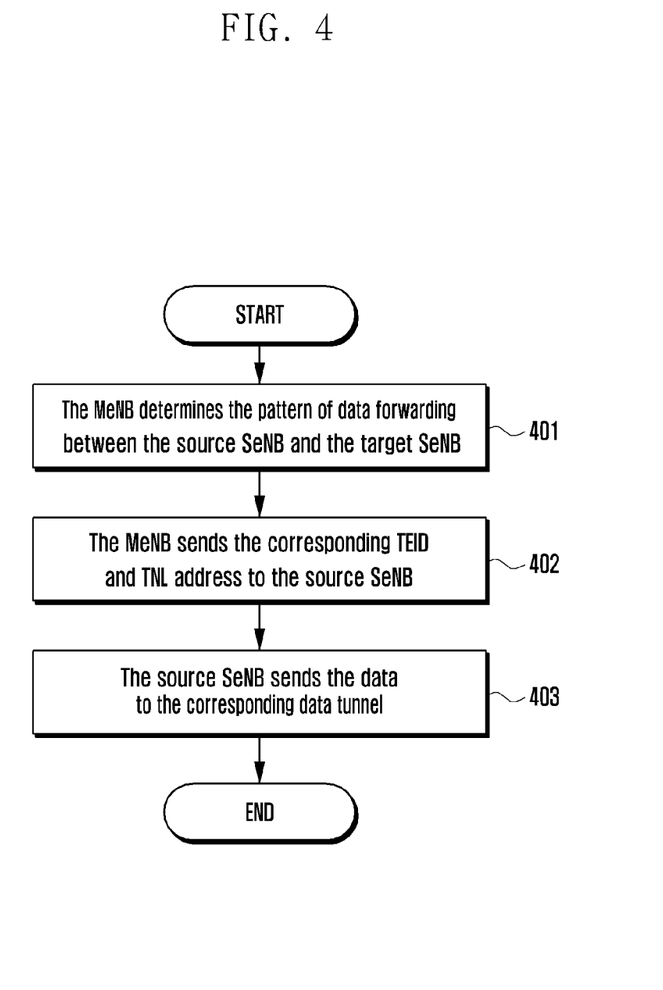
FIG. 4 is a flow chart illustrating a method for data forwarding in a small cell system according to another embodiment of the present application.

FIG. 4 is a schematic diagram illustrating a method for data forwarding in a small cell system according to another embodiment of the present application, wherein the O&M needs to configure the MeNB to support the direct data forwarding or the indirect data forwarding. For example, based on the network deployments, when there is no X2 interface between most of eNBs within the coverage of an eNB that serves as a MeNB, the MeNB is configured by the O&M to support the indirect data forwarding; when there is X2 interface available between most of eNBs within the coverage of the MeNB, the MeNB is configured by the O&M to support the direct data forwarding. The O&M can consider other factors during configuration, or the MeNB is configured by the O&M regarding which eNBs served as SeNBs the direct data forwarding may apply, and which may not, so that the MeNB is able to determine the pattern of data forwarding based on the source SeNB and the target SeNB. As shown in FIG. 4, the flow includes the following blocks:

In block 401, the MeNB determines the pattern of data forwarding between the source SeNB and the target SeNB, that is, whether it is the direct data forwarding between the source SeNB and the target SeNB or the indirect data forwarding via the MeNB. According to the configurations of O&M, the MeNB determines whether it is the direct data forwarding. Furthermore, the MeNB can consider other factors to determine the pattern of data forwarding between the source SeNB and the target SeNB, such as QoS requirements.

In block 402, the MeNB sends the corresponding TEID and TNL address to the source SeNB. The TEID and TNL address is specified with respect to each bearer, including the TEID and TNL address for uplink data forwarding or the TEID, or both, and TNL address for downlink data forwarding.

If the direct data forwarding is determined by the MeNB, the MeNB sends the TEID and TNL address received from the target SeNB for the data forwarding to the source SeNB. When forwarding the data, the source SeNB directly forwards the data to the target SeNB.

If the indirect data forwarding is determined by the MeNB, the MeNB allocates the TEID and TNL address for the data forwarding, and then sends the allocated TEID and TNL address for the data forwarding to the source SeNB. As such, the MeNB stores the TEID and TNL address used for the same bearer, which are allocated by the target SeNB. When forwarding the data, the source SeNB sends the data to the MeNB, and then the MeNB forwards the received data to the target SeNB according to the TEID and TNL address allocated by the target SeNB.

In block 403, the source SeNB performs the data forwarding according to the received TEID and TNL address, and sends the data to the corresponding data tunnel. If the TEID and TNL address sent in block 402 are allocated by the target SeNB, it is the direct data forwarding to be performed. If the TEID and TNL address sent in block 402 are allocated by the MeNB, it is the indirect data forwarding to be performed.

Using the above-described method enables the network to support both direct data forwarding and indirect data forwarding based on actual situation of the network, reduce data loss and failure of data forwarding, and improve the efficiency of data forwarding.

Figure 5:
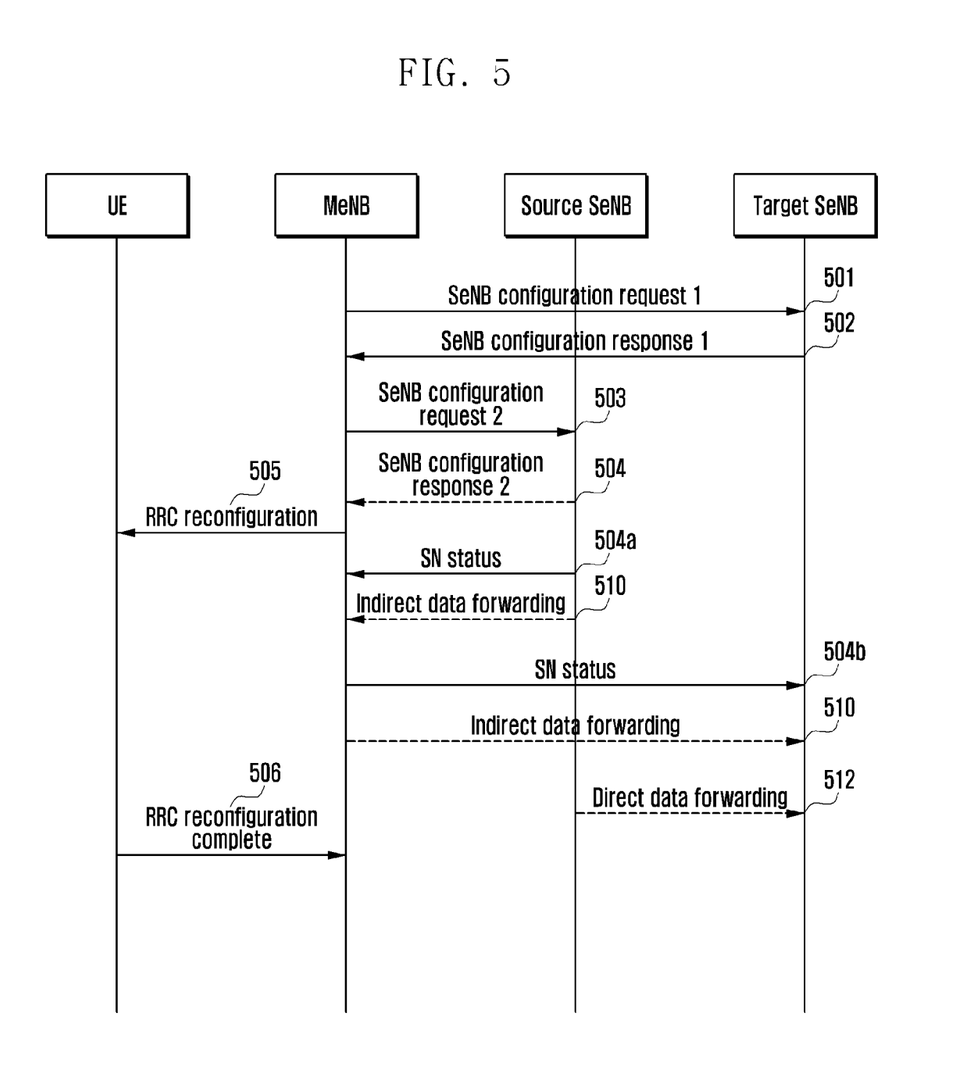
FIG. 5 is a schematic diagram illustrating a method for data forwarding in a small cell system according to an example of the present application.

FIG. 5 is a schematic diagram illustrating a method for data forwarding in a small cell system according to an example of the present application. Here, detailed description of steps irrelevant to the present application are omitted, for example, the MeNB sends a message of bearer switch request or path switch request to the MME. The flow includes the following steps.

In step 501, the MeNB sends a message of SeNB configuration request 1 to the target SeNB for adding a Scell of the SeNB or allocating a Scell at this SeNB to the UE. The message includes the eNB identifier of the source SeNB or the cell identifier of the source SeNB Scell for the UE. The cell identifier of the source SeNB scell for the UE is the same as that in block 301, which is not described in detail herein.

In step 502, the target SeNB sends a message of SeNB configuration response 1 to the MeNB.

The message includes resource configuration information in RRC container sent to the UE. The message includes the TEID and TNL address of downlink data tunnel that are allocated by the target SeNB. The message includes the TEID and TNL address for the data forwarding. The TEID and TNL address can be specified with respect to each bearer, including the TEID and TNL address for uplink data forwarding or the TEID, or both, and TNL address downlink data forwarding.

The target SeNB determines whether the direct data forwarding is feasible. The target SeNB examines whether there is an X2 interface between the target SeNB and the source SeNB based on the identifier of the SeNB or the identifier of the Scell received in step 501. If there is an X2 interface available, the direct data forwarding is feasible, otherwise it is infeasible.

When the target SeNB determines whether the direct data forwarding is feasible, in addition to whether an X2 interface is available between the target SeNB and the source SeNB, other factors may also be considered, such as, configurations of the O&M, which are not limited in the present application.

The target SeNB notifies the MeNB whether the direct data forwarding is feasible.

The target SeNB can be aware that the bearer is switched between different SeNBs, rather than from the MeNB to the SeNB, according to the identifier of the source SeNB or the cell identifier of the source Scell in step 501, so as to determine whether the direct data forwarding is feasible. If the bearer is switched from the MeNB to the SeNB, the message in step 501 may not include the identifier of the source SeNB or the cell identifier of the source Scell, such that the target SeNB is aware that the switch is from the MeNB to the SeNB, without determining whether the direct data forwarding is feasible or not.

Note that step 501, step 502 and step 503, step 504 can be within a single procedure, that is, adding a SeNB (or Scell) and deleting a SeNB (or Scell) is achieved by one X2 procedure, or can be in different procedures, that is, adding a SeNB (or Scell) is defined as one X2 procedure, and deleting a SeNB (or Scell) is defined as another X2 procedure.

In step 503, the MeNB determines whether it is the direct data forwarding or the indirect data forwarding. According to whether the direct data forwarding is feasible, which is received from the target SeNB, the MeNB determines whether it is the direct data forwarding or the indirect data forwarding. Other information can also be considered by the MeNB to determine whether it is the direct data forwarding or the indirect data forwarding, such as configurations of one or more of the O&M, properties of service, and so forth.

The MeNB sends a message of SeNB configuration request 2 to the source SeNB. If the direct data forwarding is determined by the MeNB, the MeNB sends the TEID and TNL address received from the target SeNB for the data forwarding to the source SeNB. If the indirect data forwarding is determined by the MeNB, the MeNB allocates the TEID and TNL address for the data forwarding between the source SeNB and the MeNB, and then sends the allocated TEID and TNL address to the source SeNB. When the MeNB receives the data forwarded from the source SeNB, the MeNB sends the forwarded data to the target SeNB according to the TEID and TNL address received from the target SeNB for the data forwarding in step 502. The TEID and TNL address can be specified with respect to each bearer, and includes the TEID and TNL address for uplink data forwarding and/or the TEID and TNL address for downlink data forwarding.

In step 504, the source SeNB sends a message of SeNB configuration response 2 to the MeNB.

In step 504a, the source SeNB sends a message of sequence number (SN) status to the MeNB.

In step 504b, the MeNB sends a message of SN status to the target SeNB.

The source SeNB starts the data forwarding according to the received TEID and TNL address. If the TEID and TNL address received by the source SeNB are allocated by the target SeNB, it is the direct data 512 forwarding to be performed. If the TEID and TNL address received by the source SeNB are allocated by the MeNB, it is the indirect data 510 forwarding to be performed.

Note that there is no absolute order between step 504a and step 505.

In step 505, the MeNB sends a RRC reconfiguration message to the UE, to request the UE to configure a new SeNB, and delete the configurations for the source SeNB.

In step 506, the UE sends a RRC reconfiguration complete message to the MeNB.

Using the above-described method, it enables the network to support both direct data forwarding and indirect data forwarding based on actual situation of the network, reduce data loss and failure of data forwarding, and improve the efficiency of data forwarding.

Figure 6:
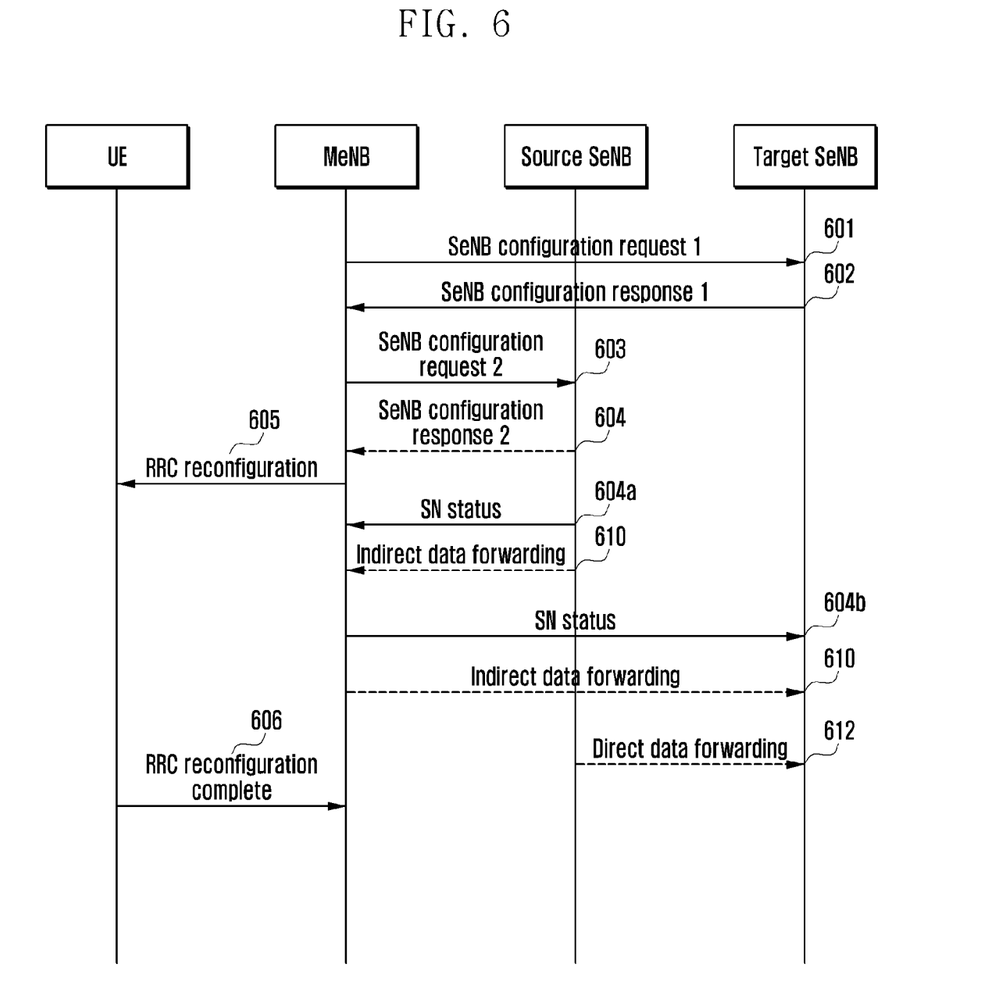
FIG. 6 is a schematic diagram illustrating a method for data forwarding in a small cell system according to another example of the present application.

FIG. 6 is a schematic diagram illustrating a method for data forwarding in a small cell system according to another example of the present application. Here, detailed description of steps irrelevant to the present application are omitted, for example, the MeNB sends a message of bearer switch request or path switch request to the MME. The flow includes the following steps.

In step 601, the MeNB sends a message of SeNB configuration request 1 to the target SeNB for adding a Scell of the SeNB or allocating a Scell at this SeNB to the UE.

In step 602, the target SeNB sends a message of SeNB configuration response 1 to the MeNB.

The message includes resource configuration information in RRC container sent to the UE. The message includes the TEID and TNL address of downlink data tunnel that are allocated by the target SeNB. The message includes the TEID and TNL address for the data forwarding. The TEID and TNL address can be specified with respect to each bearer, including the TEID and TNL address for uplink data forwarding or the TEID, or both, and TNL address for downlink data forwarding.

Note that step 601, step 602 and step 603, step 604 can be within a single procedure, that is, adding a SeNB (or Scell) and deleting a SeNB (or Scell) is achieved by one X2 procedure, or can be in different procedures, namely, adding a SeNB (or Scell) is defined as one X2 procedure, and deleting a SeNB (or Scell) is defined as another X2 procedure.

In step 603, the MeNB determines whether it is the direct data forwarding or the indirect data forwarding. The method for the MeNB to determine whether it is the direct data forwarding or the indirect data forwarding is the same with block 401, which is not described in detail herein.

The MeNB sends a message of SeNB configuration request 2 to the source SeNB. If the direct data forwarding is determined by the MeNB, the MeNB sends the TEID and TNL address received from the target SeNB for the data forwarding to the source SeNB. If the indirect data forwarding is determined by the MeNB, the MeNB allocates the TEID and TNL address for the data forwarding between the source SeNB and the MeNB, and then sends the allocated TEID and TNL address to the source SeNB. When the MeNB receives the data forwarded from the source SeNB, the MeNB sends the forwarded data to the target SeNB according to the TEID and TNL address received from the target SeNB for the data forwarding in step 602.

In step 604, the source SeNB sends a message of SeNB configuration response 2 to the MeNB.

In step 604a, the source SeNB sends a message of SN status to the MeNB.

In step 604b, the MeNB sends a message of SN status to the target SeNB.

The source SeNB starts the data forwarding according to the received TEID and TNL address. If the TEID and TNL address received by the source SeNB are allocated by the target SeNB, it is the direct data 612 forwarding to be performed. If the TEID and TNL address received by the source SeNB are allocated by the MeNB, it is the indirect data 610 forwarding to be performed.

Note that there is no absolute order between step 604a and step 605.

In step 605, the MeNB sends a RRC reconfiguration message to the UE, to request the UE to configure a new SeNB, and delete the configurations for the source SeNB.

In step 606, the UE sends a RRC reconfiguration complete message to the MeNB.

Figure 7:
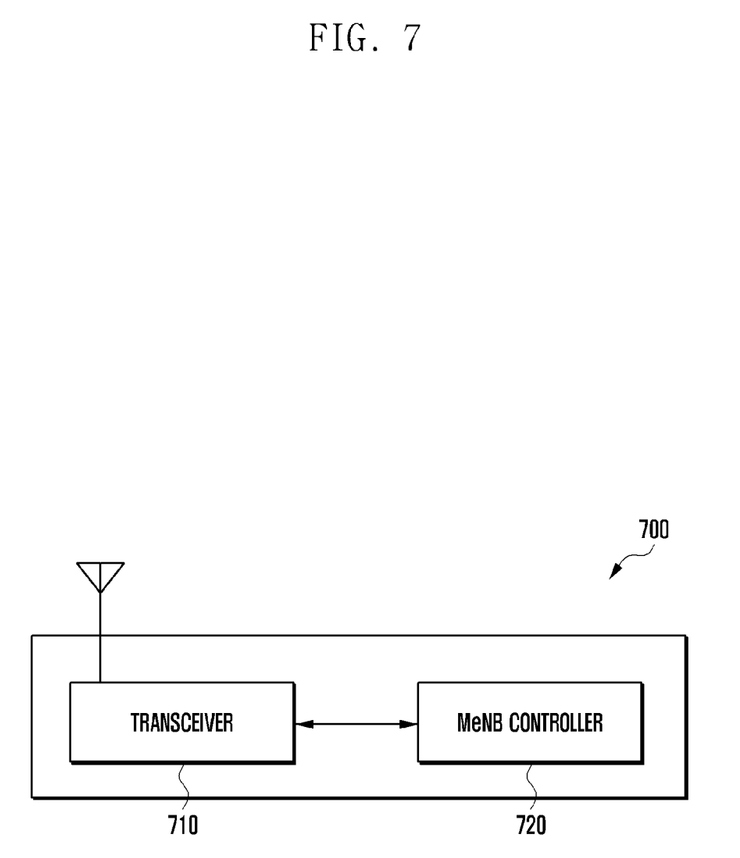
FIG. 7 is a schematic diagram illustrating a master base station (MeNB) according to an embodiment of the present application.

FIG. 7 is a schematic diagram illustrating a master base station (MeNB) according to an embodiment of the present application.

Referring to FIG. 7, the MeNB 700 according to an embodiment of the present application includes a transceiver unit 710 and an MeNB control unit 720 for controlling the transceiver unit 710.

In an embodiment, the transceiver unit 710 transmits or receives a signal to or from at least one of a secondary base station (SeNB) and a terminal including UE. Specifically, through the transceiver unit 710, a wired or wireless signal can be transmitted to or received from at least one of the SeNB and a terminal including the UE under the control of the MeNB control unit 720.

The MeNB control unit 720 controls the whole operation of the MeNB 700 described in an embodiment of the present application. In one example, the operation of the MeNB 700 can be determined on the basis of information contained in a signal transmitted to or received from at least one of a terminal including the UE, a source SeNB, and a target SeNB. Also, setting information for data forwarding and data related information can be transmitted to or received from at least one of a terminal including the UE, a source SeNB, and a target SeNB. Additionally, the MeNB control unit 720 determines particulars related to the operation of the MeNB 700 on the basis of a signal transmitted or received through the transceiver unit 710, and control the operation of the MeNB 700 according to determination results.

Figure 8:
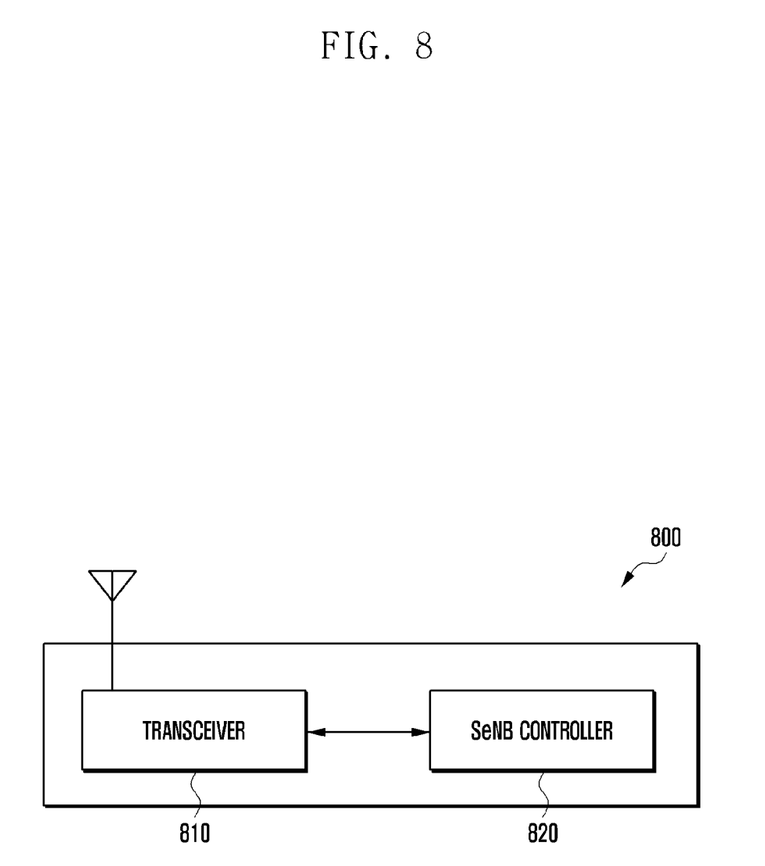
FIG. 8 is a schematic diagram illustrating a secondary base station (SeNB) according to an embodiment of the present application.

FIG. 8 is a schematic diagram illustrating a secondary base station (SeNB) according to an embodiment of the present application.

Referring to FIG. 8, the SeNB 800 according to an embodiment of the present application includes a transceiver unit 810 and an SeNB control unit 820 for controlling the transceiver unit 810. Additionally, the SeNB control unit 820 controls the operation of the SeNB in case the SeNB 800 operates as a source SeNB or as a target SeNB.

In an embodiment, the transceiver unit 810 transmits or receives a signal to or from at least one of the MeNB, other SeNB, and a terminal including UE. Specifically, through the transceiver unit 810, a wired or wireless signal can be transmitted to or received from at least one of the MeNB, other SeNB, and a terminal including the UE under the control of the SeNB control unit 820.

The SeNB control unit 820 can control the whole operation of the SeNB 800 described in an embodiment of the present application. In one example, the operation of the SeNB 800 can be determined on the basis of information contained in a signal transmitted to or received from at least one of a terminal including the UE, the MeNB, and other SeNB. Also, setting information for data forwarding and data related information can be transmitted to or received from at least one of a terminal including the UE, other SeNB, and the MeNB. In case the SeNB operates as a source SeNB, the SeNB control unit 820 can perform a control related to an operation of forwarding data to a target SeNB through the MeNB or directly. Additionally, the SeNB control unit 820 determines particulars related to the operation of the SeNB 800 on the basis of a signal transmitted or received through the transceiver unit 810, and controls the operation of the SeNB 800 according to determination results.

Using the above-described method, it enables the network to support both direct data forwarding and indirect data forwarding based on actual situation of the network, reduce data loss and failure of data forwarding, and improve the efficiency of data forwarding.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a master node (MN) in a wireless communication system, the method comprising:
   transmitting, to a target secondary node (SN), a first request message for adding the target SN, the first request message including configuration information on a source SN;
   receiving, from the target SN, a response message including an address of the target SN, wherein the address includes a tunnel endpoint identifier (TEID) and a transport network layer (TNL) address for a data forwarding; and
   transmitting, to the source SN, a second request message including a forwarding address,
   wherein the second request message includes the address of the target SN as the forwarding address, in case that a direct data forwarding from the source SN to the target SN is used.

2. The method of claim 1, wherein resources for a terminal are allocated by the target SN after the first request message is transmitted.

3. The method of claim 1, further comprising transmitting, to a terminal, a message for radio resource control (RRC) reconfiguration including configuration information on the target SN.

4. The method of claim 1, further comprising:
   receiving, from the source SN, an SN status transfer message including a status of the source SN; and
   transmitting, to the target SN, the SN status transfer message for the direct data forwarding from the source SN to the target SN.

5. A method performed by a target secondary node (SN) in a wireless communication system, the method comprising:
   receiving, from a master node (MN), a request message for adding the target SN, the request message including configuration information on a source SN;
   transmitting, to the MN, a response message including an address of the target SN, wherein the address includes a tunnel endpoint identifier (TEID) and a transport network layer (TNL) address for a data forwarding; and
   receiving, from the source SN, data by a direct data forwarding based on the address of the target SN delivered to the source SN.

6. The method of claim 5, further comprising allocating resources for a terminal after receiving the request message.

7. The method of claim 5, further comprising receiving, from the MN, an SN status transfer message for the direct data forwarding from the source SN to the target SN, wherein the SN status transfer message includes a status of the source SN.

8. A method performed by a source secondary node (SN) in a wireless communication system, the method comprising:
   receiving, from a master node (MN), a request message including a forwarding address, wherein the request message includes an address of a target SN as the forwarding address, in case that a direct data forwarding from the source SN to the target SN is used;
   transmitting, to the MN, an SN status transfer message including a status of the source SN; and
   transmitting, to the target SN, data by the direct data forwarding based on the address of the target SN,
   wherein the address includes a tunnel endpoint identifier (TEID) and a transport network layer (TNL) address for a data forwarding.

9. A master node (MN) in a wireless communication system, the MN comprising:
   a transceiver configured to transmit and receive a signal; and
   a controller coupled with the transceiver and configured to:
   transmit, to a target secondary node (SN), a first request message for adding the target SN, the first request message including configuration information on a source SN,
   receive, from the target SN, a response message including an address of the target SN, wherein the address includes a tunnel endpoint identifier (TEID) and a transport network layer (TNL) address for a data forwarding, and transmit, to the source SN, a second request message including a forwarding address, wherein the second request message includes the address of the target SN as the forwarding address, in case that a direct data forwarding from the source SN to the target SN is used.

10. The MN of claim 9, wherein resources for a terminal are allocated by the target SN after the first request message is transmitted.

11. The MN of claim 9, wherein the controller is further configured to transmit, to a terminal, a message for radio resource control (RRC) reconfiguration including configuration information on the target SN.

12. The MN of claim 9, wherein the controller is further configured to:

receive, from the source SN, an SN status transfer message including a status of the source SN, and transmit, to the target SN, the SN status transfer message for the direct data forwarding from the source SN to the target SN.

13. A target secondary node (SN) in a wireless communication system, the target SN comprising:

a transceiver configured to transmit and receive a signal; and a controller coupled with the transceiver and configured to:

receive, from a master node (MN), a request message for adding the target SN, the request message including configuration information on a source SN, transmit, to the MN, a response message including an address of the target SN, wherein the address includes a tunnel endpoint identifier (TEID) and a transport network layer (TNL) address for a data forwarding, and receive, from the source SN, data by a direct data forwarding based on the address of the target SN delivered to the source SN.

14. The target SN of claim 13, wherein the controller is further configured to allocate resources for a terminal after receiving the request message.

15. The target SN of claim 13, wherein the controller is further configured to receive, from the MN, an SN status transfer message for the direct data forwarding from the source SN to the target SN, and wherein the SN status transfer message includes a status of the source SN.

16. A source secondary node (SN) in a wireless communication system, the source SN comprising:

a transceiver configured to transmit and receive a signal; and a controller coupled with the transceiver and configured to:

receive, from a master node (MN), a request message including a forwarding address, wherein the request message includes an address of a target SN as the forwarding address, in case that a direct data forwarding from the source SN to the target SN is used, transmit, to the MN, an SN status transfer message including a status of the source SN, and transmit, to the target SN, data by the direct data forwarding based on the address of the target SN, wherein the address includes a tunnel endpoint identifier (TEID) and a transport network layer (TNL) address for a data forwarding.

* * * * *